W. STUEBING, Sr.
MACHINE FOR MOUNTING METAL STRIPS.
APPLICATION FILED OCT. 26, 1909.

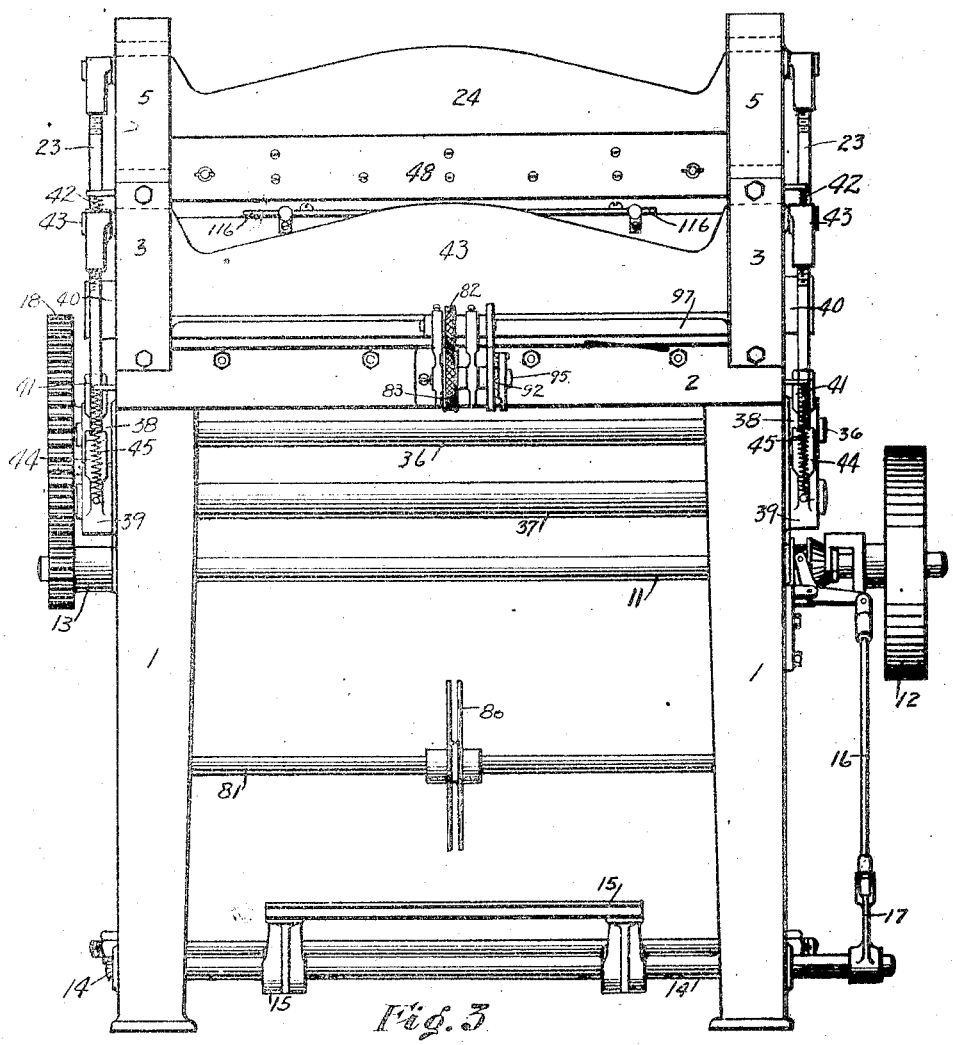

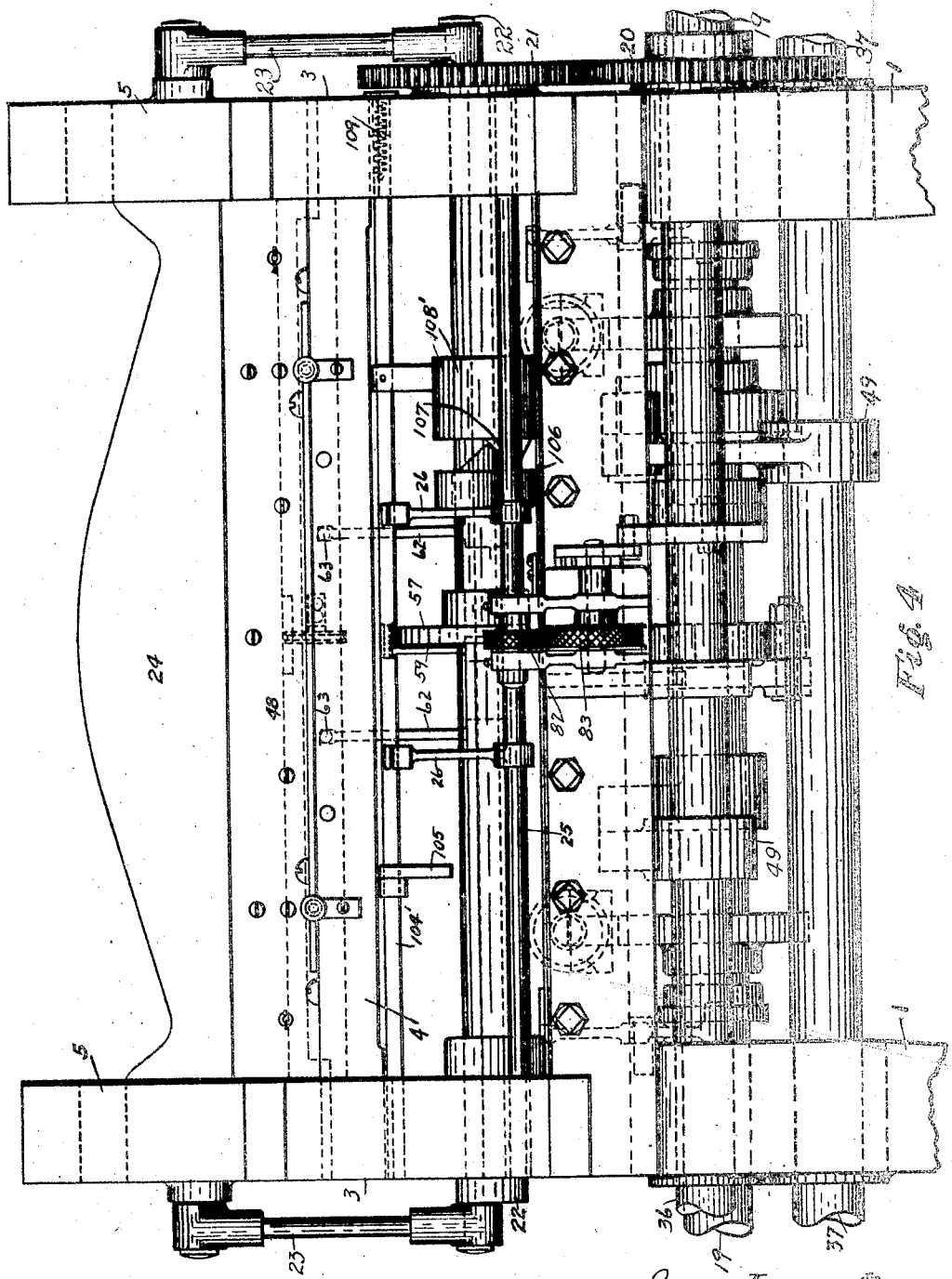

1,057,295.

Patented Mar. 25, 1913.

9 SHEETS—SHEET 5.

Witnesses
Inventor
Attorney

W. STUEBING, Sr.
MACHINE FOR MOUNTING METAL STRIPS.
APPLICATION FILED OCT. 26, 1909.

1,057,295.

Patented Mar. 25, 1913.
9 SHEETS—SHEET 7.

W. STUEBING, Sr.
MACHINE FOR MOUNTING METAL STRIPS.
APPLICATION FILED OCT. 26, 1909.
1,057,295.
Patented Mar. 25, 1913.
9 SHEETS—SHEET 8.
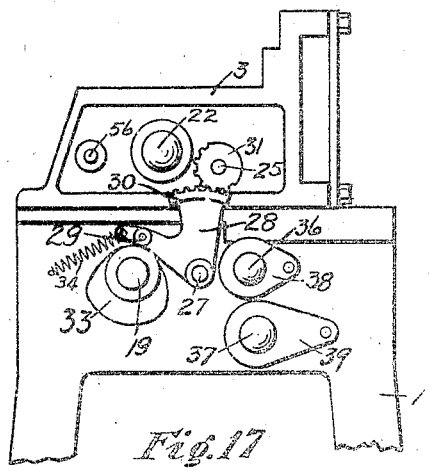
Fig.17
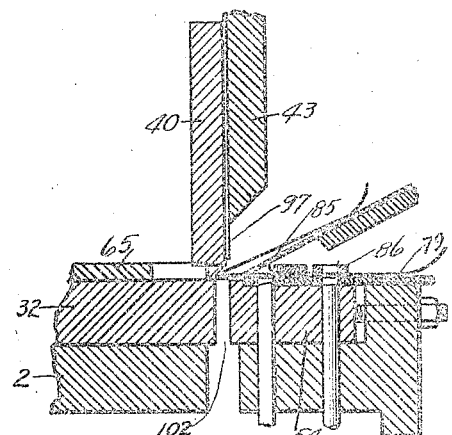
Fig.10
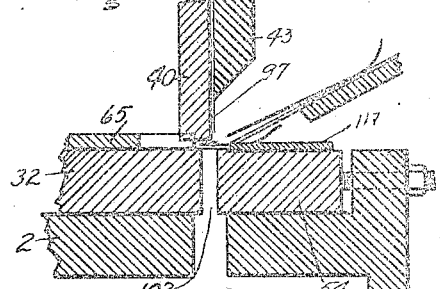
Fig.11
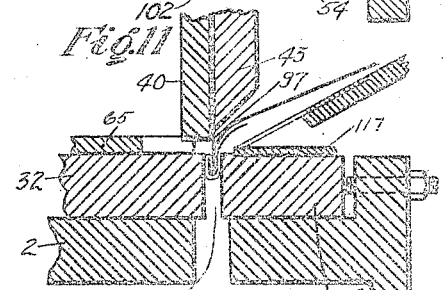
Fig.12
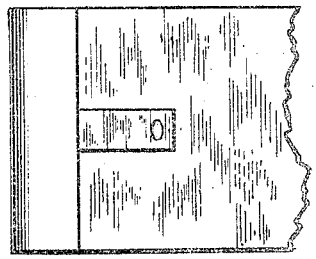
Fig.15
Fig.14
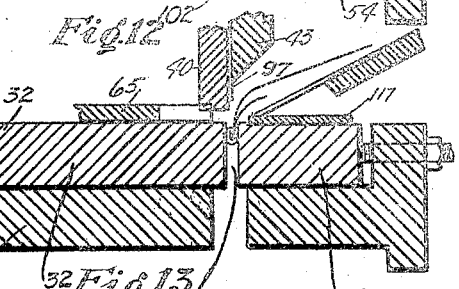
Fig.13
Witnesses
Kathryn Stuebli
Jno H. Munson
Inventor
Wm Stuebing Sr.
by John W. Kroehle
Attorney

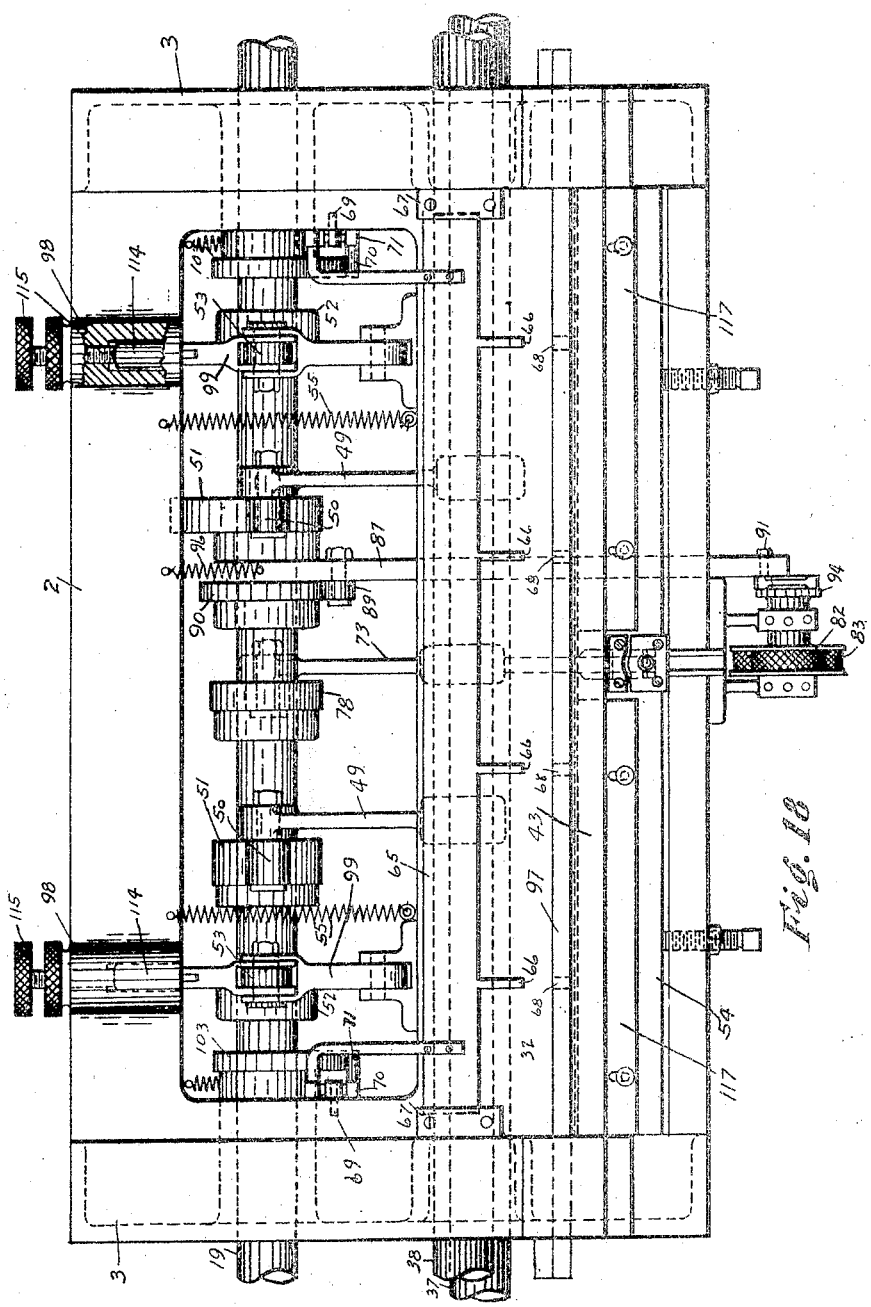

UNITED STATES PATENT OFFICE.

WILLIAM STUEBING, SR., OF CINCINNATI, OHIO.

MACHINE FOR MOUNTING METAL STRIPS.

1,057,295. Specification of Letters Patent. Patented Mar. 25, 1913.

Application filed October 26, 1909. Serial No. 524,593.

*To all whom it may concern:*

Be it known that I, WILLIAM STUEBING, Sr., a citizen of the United States, residing at the city of Cincinnati, in the county of Hamilton and State of Ohio, have invented certain new and useful Improvements in Machines for Mounting Metal Strips, of which the following is a specification.

The object of my invention is to produce a cheap, simple and efficient machine for mounting metal strips on the edges of cards, calendars, advertising and show cards and any other article needing a metal bound edge.

The essential features of my invention consists in automatically feeding the metal sheet under the cutting knife or shears, automatically cutting the same into strips of the desired width; automatically folding or bending the same; automatically registering the same to keep the strip in proper alinement when necessary; automatically delivering the same to a point near the pressure bar; automatically pushing or forcing the same under the pressure bar; automatically pressing the folded metal strip onto the edge of the article to which it is to be attached; automatically cutting metal eyelets and placing them into position to be bound in with the metal strip; and automatically locking and crimping the metal strip onto the edge of the article to be bound, with or without an eyelet attached thereto. The mechanism for cutting the strips can be regulated and adjusted to cut strips of varying widths. The mechanism for finally locking and crimping the strip onto the edge of the article to be bound, may be adjusted so as to accommodate cards, calendars or the like of varying thicknesses.

Figure 1:
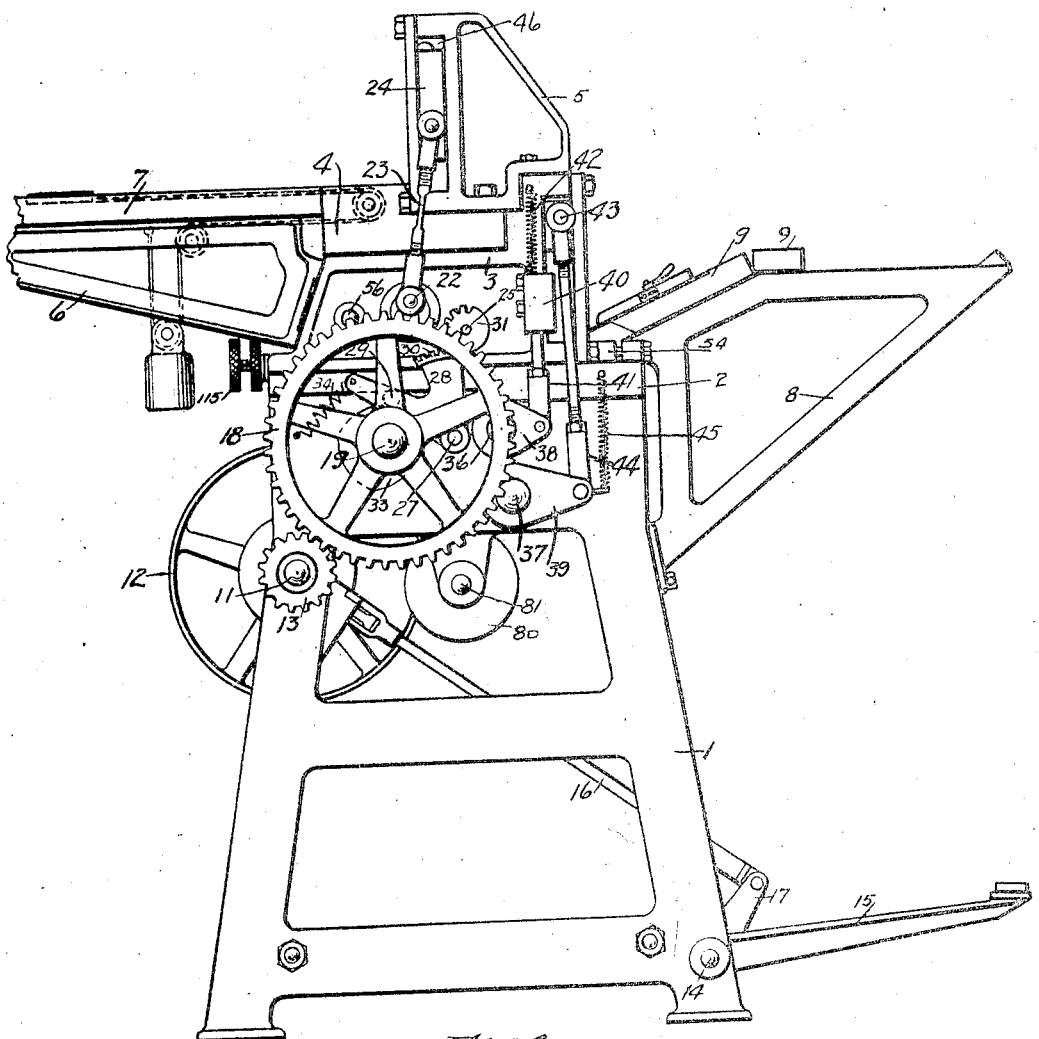
Figure 2:
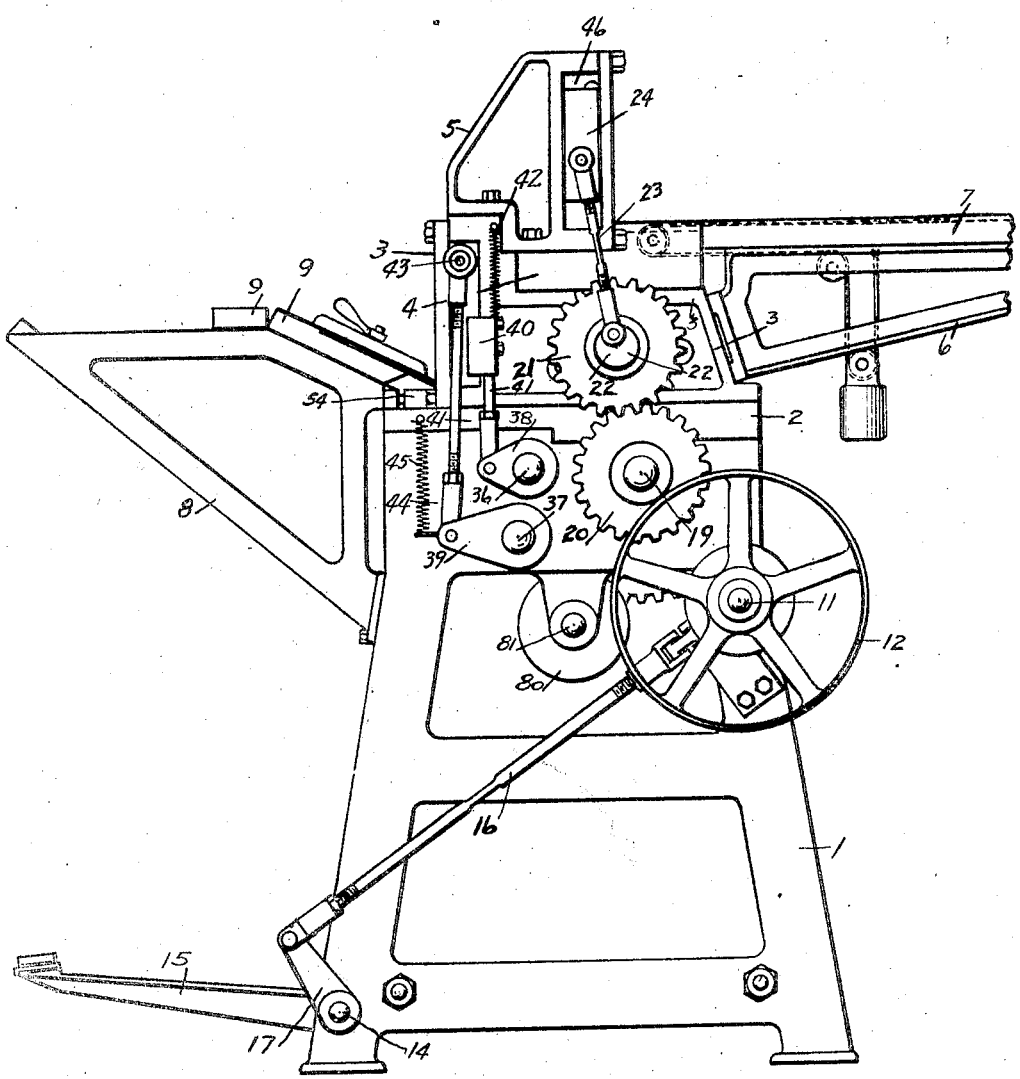
Figure 16:
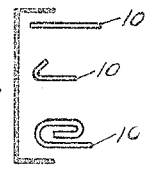
Figure 5:
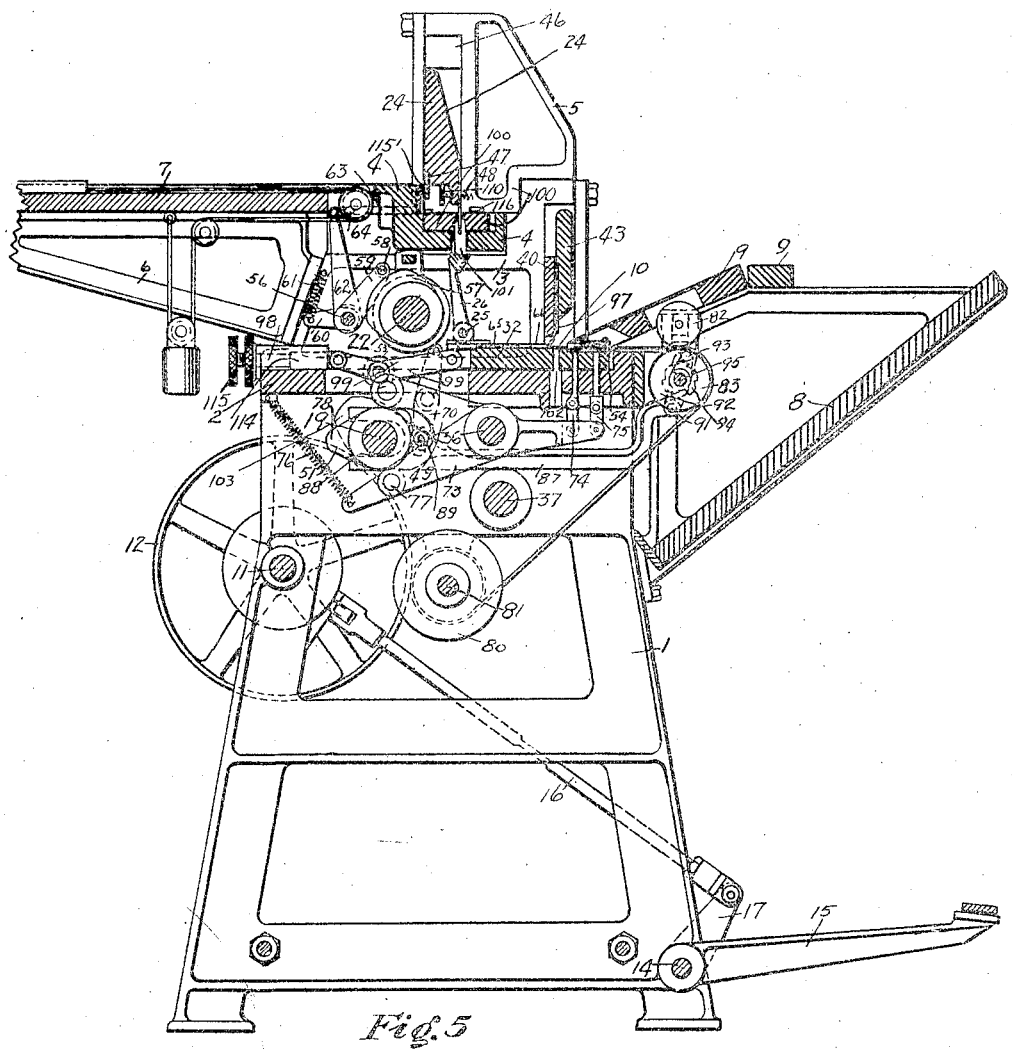
Figure 6:
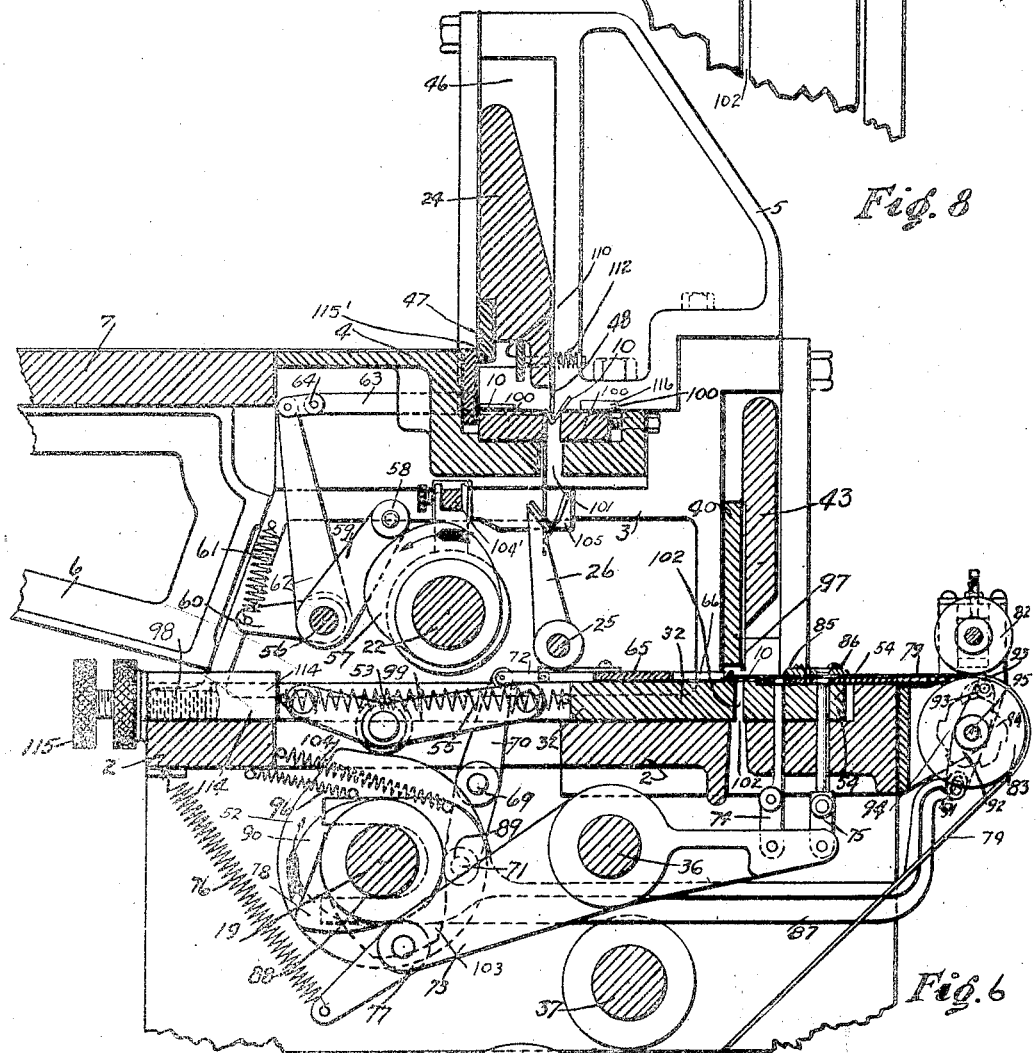
Figure 7:
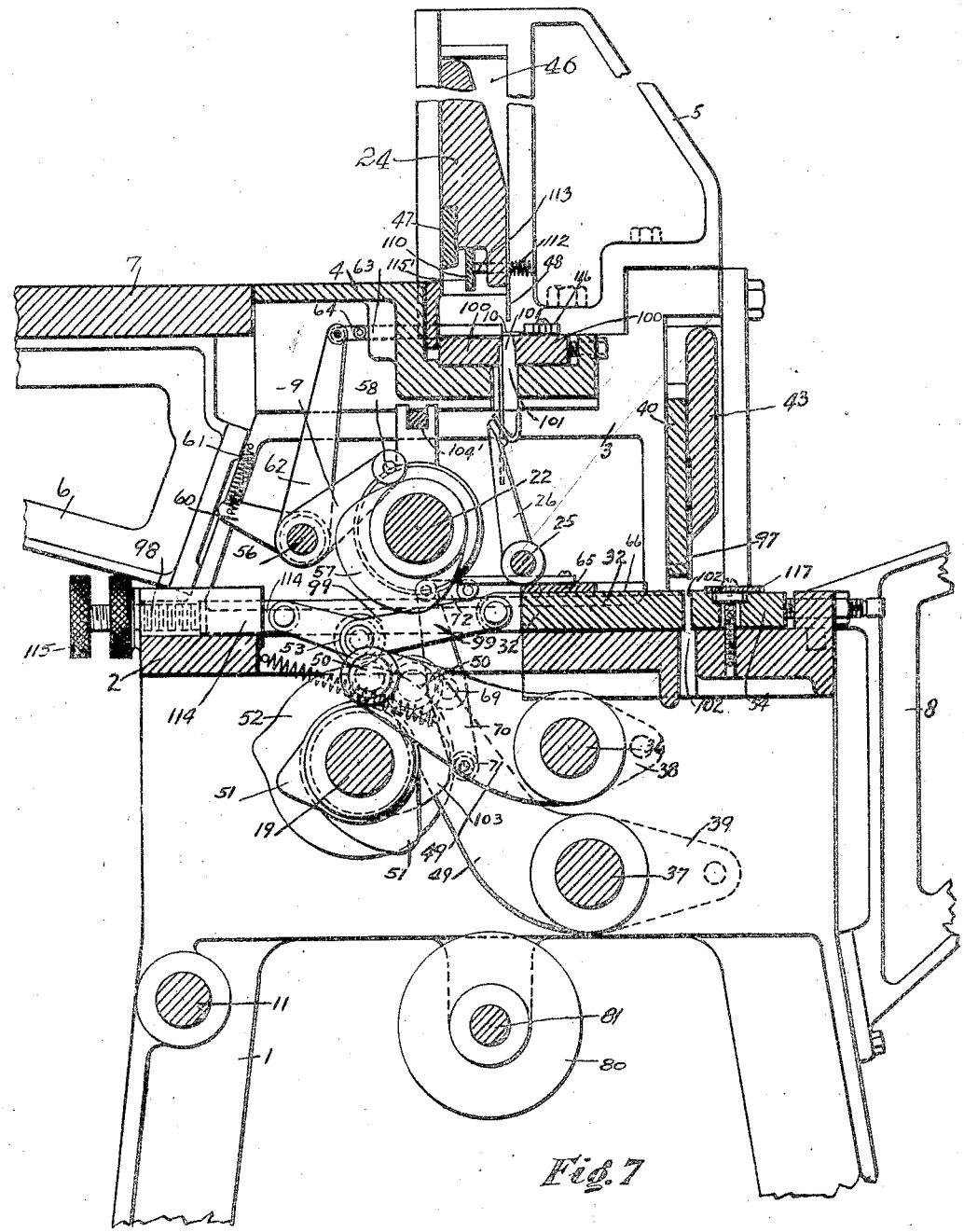

In the accompanying drawings: Figure 1 is a view in elevation of one side of the machine. Fig. 2 is a view in elevation of the opposite side of the machine. Fig. 3 is a front elevation of the machine. Fig. 4 is a front elevation with certain parts removed to show and illustrate construction and relative position of parts. Fig. 5 is a central longitudinal section through the machine. Fig. 6 is an enlarged view in section of mechanism shown in Fig. 5 with certain parts broken away. Fig. 7 is an enlarged view (in section) of parts shown in Fig. 6, except certain parts are in another position. Fig. 8 is a top view of eyelet punching mechanism. Fig. 9 is a top view of channel through which the band out of which eyelets are punched, passes. Figs. 10, 11, 12, and 13 are sectional views of the pressure bar, crimping bar, vise jaws, plate, feeding table and connecting parts which illustrate the final steps in pressing the metal strip and eyelet onto the edge of the article to be bound; Fig. 13 also showing the mechanism for finally crimping the metal strip onto the edge. Fig. 14 is a top view of a calendar complete with eyelet attached. Fig. 15 side view of calendar shown in Fig. 14, with eyelet extending outward. Fig. 16 is an end view of strip showing its contour from start to finish. Fig. 17 is a fragmentary view showing part of means for operating mechanism for delivering the strips. Fig. 18 is a plan view of the cam shaft and cams and levers co-acting therewith, rock shafts for operating the pressure bar, and part of the mechanism for moving the strip under the pressure bar, eyelet mechanism and connecting parts.

The machine is supported on frame work 1, carrying a top plate 2. To this plate 2 and extending upward therefrom, are housing frames 3. On these housing frames 3, I place a plate 4 and to housing frames 3 and plate 4, I fasten the upper housing frames 5. To the housing frames 3, I attach brackets 6 carrying table 7 on which the tin is fed to the machine.

At the forward end of the machine I provide brackets 8 connected to frame 1 and plate 2. On these brackets 8, I place a feed board 9. If desired I may use one or more of these feed boards of any size or contour.

The driving shaft 11 journaled in the frames 1, carries a clutch pulley 12 at one end and at the opposite end a driving gear 13. On a shaft 14 journaled in frames 1, I place a treadle 15. The shaft 14 is connected to the clutch pulley 12 through the agency of rod 16 and lever 17, so that through the oscillation of the shaft 14 by working the treadle 15, the clutch pulley 12 is thrown in and out of operation to run or stop the machine. The gear 13 meshes with the gear wheel 18 situated at one end of shaft 19 imparting motion to said shaft 19; at its opposite end said shaft 19 carries gear wheel 20. This shaft 19 is a cam carrying shaft. The gear wheel 20 meshes with gear wheel 21 which drives an eccentric shaft 22. Adjustable connecting rods 23 extend from the eccentric shaft 22 to the folding bar 24. This folding bar 24 extends across the machine and works up and down in housings 46 and is shaped as shown in Figs. 3, 5 and 6, having cutting knife 47 and a folding blade 48, the strip 10 being first cut off the sheet and then moved over under the folding blade 48, (which mechanism will be hereinafter set forth).

25 represents an oscillatory shaft carrying delivery fingers 26, V shaped at their upper ends (see Fig. 6). On one side of the machine (see Figs. 1 and 17) I pivot at 27 a segmental lever 28 carrying a roller 29 and a toothed segment 30 which meshes with the gear 31 attached to shaft 25, imparting motion to the shaft 25, that is, oscillating the same so that the delivery fingers 26 deliver the bent or folded strip 10 down onto the movable vise jaw 32. This oscillation of shaft 25 is performed by roller 29 riding the nose of the cam 33 on cam shaft 19, the spring 34, pulling back the segmental lever and oscillating the shaft 25 backward into normal position, consequently raising the delivery fingers ready to receive the next strip of metal for delivery.

I will now refer to the pressure bar and its connections.

Rock shafts 36 and 37 extend entirely across the machine and carry at each side, respectively, rocker arms 38 and 39. A pressure bar 40 extends across the machine and moves down and up, down onto the metal strip and up away from it, and at each end connecting rods 41 extend from said pressure bar 40 down to the rocker arms 38. These rocker arms, when the rock shaft 36 is rocked pulls down the pressure bar 40, onto the metal strip and exerts pressure upon it to fold and double it onto the card or calendar, the spring 42 pulling the pressure bar up after its work is complete, in position to come down again.

I will now refer to the crimping bar.

The crimping bar 43 has at its lower edge a knife or blade 97, the bar extending across the machine. Rock shaft 37 extends entirely across the machine and carries at each end a rocker arm 39, connecting rods 44 extending from the ends of the crimping bar 43 to the rocker arms 39. The oscillation of the shaft 37 moves the bar 43 downward to press, crimp and force the work down into position for a final crimp and lock onto the card or calendar, and the springs 45 force the crimping bar 43 upward into normal position for another descent. The downward movement of the pressure bar 40 and crimping bar 43 as stated before is performed by the oscillation of shafts 36 and 37. This oscillation is accomplished through the agency of cam levers 49, 49, one on each of said shafts, the levers carrying at their ends rollers 50, 50, one on each lever 49, 49. By reason of these rollers riding the high and low parts of the cams 51 the shafts 36 and 37 are rocked and thus through rocker arms 38 and 39 and connecting rods 41 and 44 and springs 42 and 45 an alternate reciprocating movement is imparted to the pressure bar 40 and crimping bar 43.

I will now describe the mechanism for finally crimping and mounting the strip upon the card or calendar. I provide a vise for this final operation, the vise consisting of the stationary jaw 54 and movable jaw 32. Between the bearing 98, (see Fig. 13) and the end of movable jaw 32 I provide a toggle joint 99, which at its rear end has a pin 114, by which toggle joint 99 is connected to the bearing 98. On cam shaft 19 I place a cam 52 which operates upon the toggle joint roller 53 and in so doing the movable jaw 32 of the vise is moved forward toward the stationary jaw 54 pressing the work between said jaws, a spring 55 pulling the movable jaw backward into position ready for another forward movement.

I will now describe how the metal strip 10 after being cut or sheared is forced under the folding bar which folds it to a form secondly illustrated in Fig. 16.

I provide a rock shaft as 56 operated by a cam 57 on eccentric shaft 22 through the agency of roller 58 on cam lever 59; attached to the said rock shaft 56 is an arm 60 carrying a spring 61 at its extremity and another arm 62 pinned on shaft 56 extends upward as shown (see Figs. 6 and 7), and is connected to fingers or plungers 63 by a link connection 64. The roller 58 riding from the low to the high point of said cam 57 forces the fingers or plungers 63 forward and said spring pulls them backward following the nose of the cam. This forward and backward movement is caused by the shaft 56 being rocked. The fingers or plungers 63 in moving forward push the metal strip over onto the jaws 100, 100, between which is provided a slot 101; the strip is across this slot and is firmly held between the finger ends and gage 116, so that when the blade 48 of the folding bar strikes it, the strip is folded and forced down through said slot 101 onto the V shaped top of the delivery fingers 26.

I will now describe the mechanism for forcing the metal strip 10 after it has been folded under the pressure bar 40 and crimping bar 43, that is: over the slot 102 between vise jaws 32 and 54 where the folded strip is locked, crimped and mounted upon the card or calendar.

On the movable vise jaw 32 I place flat plate or bar 65 having fingers 66, the bar sliding forward and backward in ways 67 in the top of vise jaw 32, the fingers 66 when moving forward and backward pass through slots 68 in the pressure bar 40 so as to properly push the metal strip to its destination over the slot 102 (see Fig. 18). On each side of machine frame 1, I place a stud 69 on which studs are pivoted levers 70 these levers carry rollers 71 and at their upper ends are connected to links 72 which links are also connected at their forward end to plate or bar 65. The levers 70 are actuated by rollers 71 traveling faces of cams 103 and when the noses of cams 103 are traveled the bar 65 and fingers 66 are forced backward and when the low part of the cams are traveled the springs 104 which have been placed at a tension relax and push or force the bar and fingers forward to push the metal strip in place over slot 102. After the strip 10 has been cut and folded, in order that, when it is placed upon the V shaped part of delivery finger 26, it will not fall out of a regular path or out of alinement, I provide a registering device or laterally reciprocating gage formed of a registering bar 104' and connections. On eccentric shaft 22 I place a set of cams or disks 106, 107 (see Fig. 4) having peculiar shaped faces. The cam 107 is on a sleeve 108 and a connecting bar reaches from said cam 107 to the registering bar 104' so that as the shaft 22 revolves and the peculiar shaped faces of the cams 106 and 107 pass over one another the sleeve 108 moves endwise carrying cam 107 with it and consequently the registering bar 104' as it is connected by the connecting bar 108'. This shifts the registering bar endwise or laterally and the finger 105 also, the finger placing the folded metal strip in alinement if it is not in its proper position to pass onward in the machine; springs 109 on which tension is put when the bar 104 has been shifted relax at the proper time and force the registering bar back into its normal position. I may or may not use an eyelet to fasten it in with the binding or mounting strip when it is placed on a card, calendar or the like.

I will now describe the mechanism for forming the eyelets and how they are fed under the pressure and crimping bars. These eyelets are fed under these bars at the same time the fingers 66 are pushing the folded strip forward under these bars so that the strip and eyelet lie together when the pressure bar descends and the eyelet is locked in with the mounting strip.

On rock shaft 36 I fulcrum a lever 73 at its forward end connected to cutter 74 and punch 75 which punch and cut the eyelet, and at its rear end the lever 73 is connected to a spring 76, the lever 73 also carrying a roller 77 which travels the face of a cam 78; thus roller 77 in traveling the cam 78 through lever 73 forces the punch 75 and cutter 74 upward against the metal band 79 and cuts the eyelet, and the spring 76 pulls the lever 73 and consequently the punch and cutter down into normal position, ready to move up and form another eyelet. The band 79 is placed on a large reel 80 on a shaft 81, the band extending upward around two pressure rollers 82, 83 and then passes through a channel 84 under the dies 85, 86 (see Figs. 8 and 18). The band 79 is moved forward as follows, to wit—an arm 87 at the rear at point 88, straddles the shaft 19, and carries a roller 89 passing over the face of a cam 90 (see Fig. 18), and at its forward end the arm 87 is connected at point 91 to a lever 92 carrying a pawl 93, which operates in the ratchet wheel 94 on the pressure roller 83, the lever 92 and ratchet wheel 94 being connected to a short shaft 95, the lever pivotally and the wheel rigidly. The roller 89 traveling face of cam 90 moves arm 87 forward and forces the lever 92, ratchet 94 and pawl 93 to operate the band forward. A spring 96 pulls the lever backward to stop the feeding of the band 79. Inasmuch as I pinch the eyelets from beneath, the bur around the eyelet hole will be on the upper side thereof, so that when it is in place with the metal strip on the edge of the calendar, this rough side will not scratch or mar the finished calendars when they are packed together. When the metal sheet is fed in on table 7 it is carried forward by an ordinary weight, cord or sheave mechanism (see Fig. 2), which forces it forward (every time a strip is cut) to the limiting bar 110 which gages the width of the strip. This bar can be moved forward and backward by an adjustment screw 112 which is connected therewith, and thus strips of varying widths can be cut. The jaws 100 between which the strip is folded can also be regulated so as to make the slot 101 wider or narrower, so that strips of various widths can be properly folded. Adjustment screws as 113 regulate this width of the slot.

In the bearing 98, on each side of machine, as before stated the toggle joint 99 is connected by a pin 114 which passes into said bearing 98. In this bearing work adjustment screws 115. By screwing these adjustment screws in or out in the bearing 98 the pin 114 is moved in or out, thus making the stroke of the toggle joint 99 reach closer to or farther away from the stationary jaw 54. Inasmuch as the movable jaw 32 is at the end of the toggle joint, it will come closer to or farther away from said jaw 54, thus leaving the slot 102 of greater or less width when the jaws are closed, and therefore cards and calendars of varying thicknesses can be accommodated.

The machine operates as follows, to-wit:—The metal strip is fed under the folding bar 24 until it strikes the limiting bar 110, and the knife 47 of bar 24 descends and cuts off the strip between it and the sharp knife edge 115 (see Figs. 5, 6 and 7). The cut strip falls onto the jaw 100. The bar 24, after this first strip is cut, rises, and then again descends, but, during the ascent of the folding bar 24 the fingers 63 have pushed the cut strip over the slot 101, and said fingers hold said strip over said slot between their ends and the gage 116. On the next downward movement of the bar 24 as soon as the blade 48 of the folding bar 24 impinges against the strip thus held the fingers 63 release their hold and move backward into normal position ready for the next forward movement; the blade 48 forces said strip down between jaws 100, 100, and folds the same so that a strip is being cut and one folded at every descent of the bar 24 (see Figs. 5, 6 and 7); the folded strip falls through said slot 101 onto the V shaped ends of fingers 26; at this time the registering device 104' moves to and fro placing the folded strip into proper alinement, (if necessary). The fingers 26 now move forward and downward and lay the folded strip upon the movable vise jaw 32 holding it in their V shaped ends until the fingers 66 on flat bar 65 move forward and push the folded strip under the pressure bar 40 and over slot 102. Just as soon as the fingers 66 commence pushing the folded strip out of the V shaped ends of the fingers 26 said fingers move up ready to receive another strip. The fingers 66 push the strip forward until it reaches the gage 117 on the jaw 54 and it is thus held between the ends of the fingers and said gage and at the same time the strip has been pushed forward an eyelet has been formed and is pushed in to meet the strip and the folded strip with the eyelet in place, are held between said fingers 66 and gage 117. While thus held the calendar or card upon which the strip is to be mounted is fed in by the operator. The pressure bar 40 now descends and exerts pressure upon the strip and presses it on to the calendar edge together with the eyelet; at this point the crimping bar 43 descends, the pressure bar has moved upward, as soon as the blade 97 of the crimping bar 43 impinges against the work with the strip pressed thereon, the fingers 66 move backward into normal position and the work being released from between the fingers and gage is now forced down by the crimping bar 43 through the agency of its blade 97 down into and through the slot 102. While the work is thus down in the said slot the movable jaw 32 moves forward and the work is clamped between the movable jaw 32 and the stationary jaw 54, thus the strip and eyelet are tightly and rigidly locked and fastened onto the calendar edge. When this operation is complete the movable jaw 32 moves back into normal position and the calendar taken out of the machine.

In Fig. 10 the folded strip has been pushed forward and the eyelet inward to it and a calendar inserted; in Fig. 11 the pressure bar is descending to lock the strip and eyelet onto the edge of the calendar; in Fig. 12 the crimping bar has descended and pushed the strip and calendar down into the slot and in Fig. 13, the vise is operating to finally clench and connect the strip onto the edge of the calendar the pressure bar having moved up ready for another descent. It will be seen that the crimping bar when it forces the calendar edge and strip with the eyelet fastened thereon by the pressure bar, folds the calendar edge and strip and eyelet (see particularly Fig. 12).

Of course I may mount a metal, paper, fabric or any other strip onto the card, calendar or any surface, paper, wood or metal and may use the eyelet or not, just as found necessary and I may use any other form or shape of eyelet and make it of any suitable material.

I do not wish to limit myself to the specific means for performing the various steps in the mounting of the strip upon a card or calendar as herein set forth.

From the above description it will be seen that this metal strip mounting machine made according to my invention, for the work it performs, is of an extremely simple and inexpensive nature, and is especially well adapted for the purposes for which it is designed, and it will also be obvious from the above description, that the machine is capable of considerable modification without material departure from the principles and spirit of the invention, and, for this reason, I do not wish to be understood as limiting myself to the precise form and arrangement of the several parts of the machine as herein set forth in carrying out my invention in practice.

What I claim as new and of my invention and desire to secure by Letters Patent is:—

1. In a machine of the character described, means for folding strips, pressure bar for pressing the folded strip upon the edge of a calendar, mechanism for delivering the folded strip to the pressure bar, a set of jaws, means for folding the calendar edge and strip down into a slot between said jaws, the jaws forming means for finally locking the folded strip and calendar edge together.

2. In a machine of the character described, means for folding metal strips, a pressure bar forming mechanism for pressing the folded strip on to the edge of a calendar, mechanism for delivering the folded strip from the folding mechanism to the pressure bar mechanism, and means for tightly locking the pressed strip and calendar edge together.

3. In a machine of the character described, jaw mechanism, means for folding strips into and through a slot in said jaw mechanism, means for pressing the folded strip upon the calendar edge, jaw mechanism, means for crimping and locking the calendar edge and strip so folded together, into a slot between said jaw mechanism.

4. In a machine of the character described, a cutting knife for severing strips of metal from a sheet, a folding-bar for folding the severed strip, said cutting knife and folding bar connected together and reciprocating simultaneously in the same direction and together to cut and fold the strip; means for pressing and locking the folded strip upon the edge of a calendar.

5. In a machine of the class described, means for automatically cutting strips and eyelets, means for folding strips, means for registering the strips when folded, mechanism for pressing the folded strip on a calendar edge, mechanism for delivering the folded strip and pushing it forward under the pressing mechanism, means to deliver the eyelets under the pressing mechanism at the same time, means for pressing the folded strip and eyelet together and means for locking the strip and eyelet rigidly upon the edge of a card or calendar.

6. In a machine of the class described, means for folding metal strips, means for cutting eyelets from underneath, means for delivering the eyelets and folded strips under crimping and locking mechanism and mechanism for crimping and locking the strip and eyelet onto the edge of a card or calendar.

7. In a machine of the class described, means for folding strips lengthwise, a pressure bar, means for delivering the same to a point contiguous to the pressure bar, fingers for pushing the strips under the pressure bar, said pressure bar provided with slots into which said fingers can work when pushing the strip forward and means for locking the strip upon the edge of a card or calendar.

8. In a machine of the class described, means for automatically cutting sheets of metal into strips, a folding bar, means for automatically pushing the strips under a folding bar, means for automatically folding the same, a pressure bar, means for automatically registering the strips, means for automatically delivering the same to a point contiguous to the pressure bar, means for automatically crimping and pushing the strip under the pressure bar, and means for automatically locking the strip upon the edge of a card or calendar.

9. In a machine of the class described, means for cutting metal strips, a folding bar, means for automatically pushing the metal strip under the folding bar, a pressure bar, means for automatically delivering the folded strip contiguous to a point near the pressure bar, means for cutting eyelets, means for automatically pushing the folded strip and eyelet into position under the pressure bar, and means for automatically binding the strip and eyelet on to the edge of a card or calendar.

10. In a machine of the class described, means for cutting sheet metal strips, a folding bar, means for automatically pushing the cut strip under the folding bar, a pressure bar, means for registering the strip, means for delivering the strip automatically to a point contiguous to the pressure bar, means for automatically cutting eyelets, means for automatically pushing the folded strip and eyelet under the pressure bar, means for automatically forcing the pressure bar down to lock the strip and eyelet together, and means for finally binding the strip and eyelet on the edge of a card or calendar.

11. In a machine of the class described, a folding bar, means for automatically moving a metal strip under the folding bar for folding the strip, said means holding the strip under said folding bar until it descends and impinges against said strip, means for delivering the folded strip to and under means for locking the same upon the edge of a card or calendar, and means for tightly binding the same in position on said card or calendar.

12. In a machine of the class described, means for folding a metal strip, a pressure bar, a crimping bar, means for delivering the strip contiguous to the pressure bar, means for pushing the same under the pressure bar, said means holding said strip in position until the pressure bar has locked the same in position on the calendar edge and until the crimping bar has commenced to impinge against it, and means for finally crimping and locking the strip on the edge of a card or calendar.

13. In a machine of the character described a pair of jaws, means for folding a strip between them, pressure bar mechanism for pressing the folded strip upon the edge of the calendar, a second set of jaws, means for folding the strip and calendar edge between them, said second set of jaws also forming mechanism for tightly locking the folded strip and calendar edge together.

14. In a machine of the character described, means for folding strips, pressure bar mechanism for pressing the folded strip upon the edge of a calendar, a set of jaws, means for folding the folded strip and calendar edge together down through the jaws, and finally bringing said jaws together to lock the strip and calendar edge firmly together.

Executed at Cincinnati, Hamilton county, Ohio, this 27th day of September, A. D. 1909.

WM. STUEBING, Sr.

Witnesses:
 JOHN W. STREHLI,
 WALTER C. STUEBING.